United States Patent
Lewis

(10) Patent No.: US 10,536,004 B2
(45) Date of Patent: Jan. 14, 2020

(54) AUTONOMOUS SYSTEM AND METHOD FOR REDUNDANCY MANAGEMENT OF MULTIPLE POWER SUPPLIES

(71) Applicant: Raytheon Company, Waltham, MA (US)

(72) Inventor: David C. Lewis, Hermosa Beach, CA (US)

(73) Assignee: Raytheon Company, Waltham, MA (US)

( * ) Notice: Subject to any disclaimer, the term of this patent is extended or adjusted under 35 U.S.C. 154(b) by 253 days.

(21) Appl. No.: 15/445,663

(22) Filed: Feb. 28, 2017

(65) Prior Publication Data

US 2018/0248381 A1  Aug. 30, 2018

(51) Int. Cl.
*H02J 4/00* (2006.01)
*H02J 1/14* (2006.01)
*H02J 1/10* (2006.01)

(52) U.S. Cl.
CPC ............. *H02J 4/00* (2013.01); *H02J 1/10* (2013.01); *H02J 1/14* (2013.01)

(58) Field of Classification Search
None
See application file for complete search history.

(56) References Cited

U.S. PATENT DOCUMENTS

| | | | |
|---|---|---|---|
| 3,521,150 A | 7/1970 | Bates et al. | |
| 5,200,643 A | 4/1993 | Brown | |
| 6,166,455 A | 12/2000 | Li | |
| 6,297,977 B1 | 10/2001 | Huggett et al. | |
| 6,433,444 B1* | 8/2002 | de Vries | H02J 1/10 307/64 |
| 6,894,466 B2 | 5/2005 | Huang et al. | |
| 2002/0070718 A1* | 6/2002 | Rose | H02J 1/102 323/269 |
| 2003/0056125 A1 | 3/2003 | O'Conner et al. | |
| 2003/0080624 A1* | 5/2003 | Belson | H02J 1/10 307/85 |
| 2011/0029788 A1 | 2/2011 | Domingo et al. | |

(Continued)

OTHER PUBLICATIONS

International Search Report and Written Opinion of the International Searching Authority for PCT Patent Application No. PCT/US2017/059489 dated Mar. 9, 2018, 16 pages.

*Primary Examiner* — Jared Fureman
*Assistant Examiner* — Joel Barnett

(57) ABSTRACT

A system includes an output terminal to couple to an electrical load and a plurality of power supplies coupled in parallel. Each of the power supplies includes a controller configured to monitor a power output of a downstream power supply and a power output of an upstream power supply, maintain a standby state of the power supply in response to the downstream power supply providing power below a first threshold value, transition the power supply to an voltage regulation state in response to the downstream power supply providing power above the first threshold value, and provide a maximum power in response to the upstream power supply providing power above a second threshold value. The standby state represents a state in which a power output of the power supply is 0%, and the voltage regulation state representing a state in which the power output of the power supply is above 0%.

20 Claims, 8 Drawing Sheets

(56) References Cited

U.S. PATENT DOCUMENTS

| | | | | |
|---|---|---|---|---|
| 2011/0261547 A1* | 10/2011 | Kinnard | ..................... | G06F 1/26 |
| | | | | 361/807 |
| 2014/0049117 A1* | 2/2014 | Rahman | ..................... | H02J 4/00 |
| | | | | 307/82 |
| 2014/0159506 A1 | 6/2014 | Kim et al. | | |
| 2015/0061390 A1* | 3/2015 | Zhang | ................ | H05B 33/0827 |
| | | | | 307/32 |
| 2016/0339997 A1* | 11/2016 | Crain | ..................... | B62M 27/02 |

\* cited by examiner

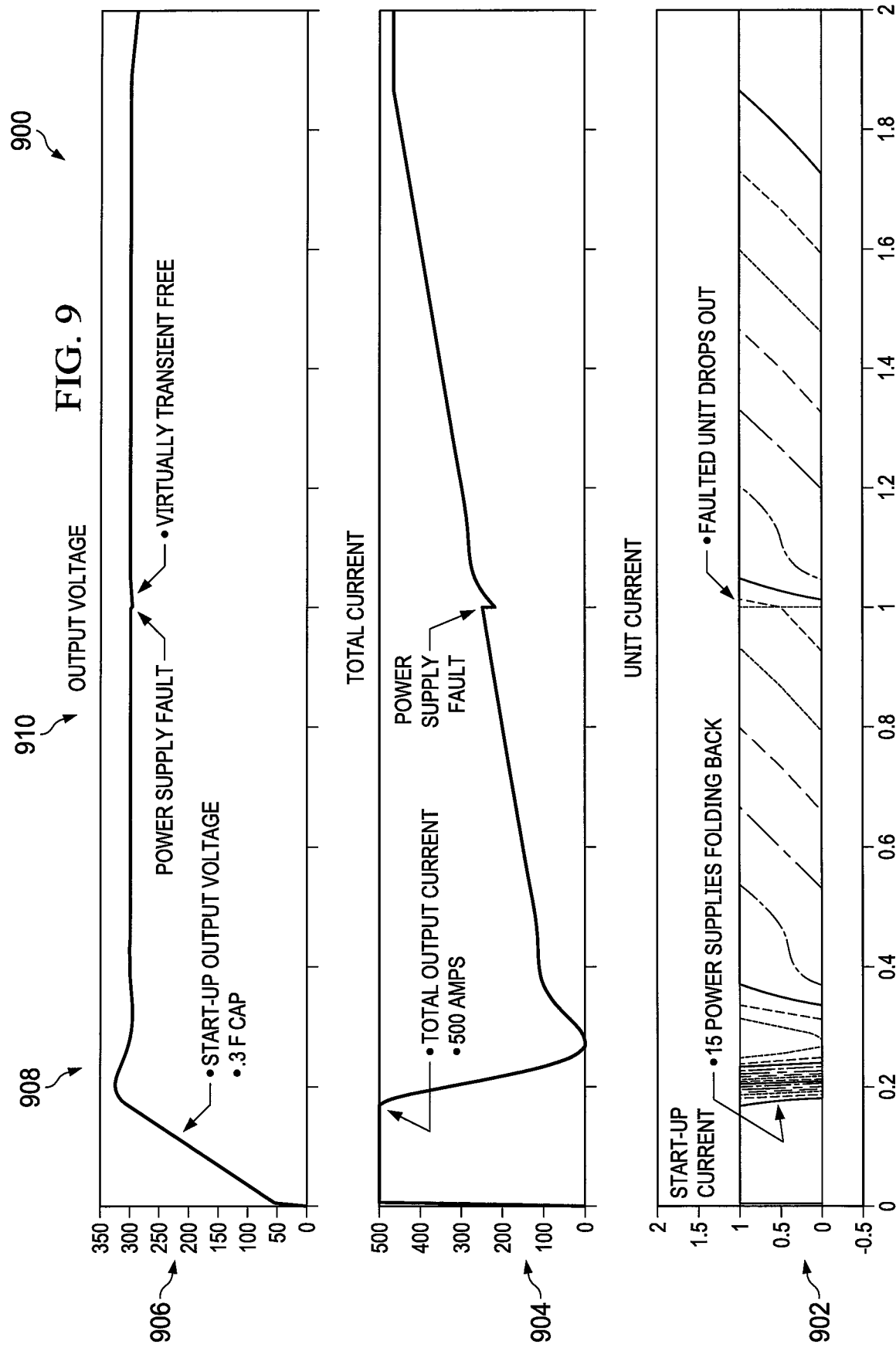

AUTONOMOUS SYSTEM AND METHOD FOR REDUNDANCY MANAGEMENT OF MULTIPLE POWER SUPPLIES

TECHNICAL FIELD

This disclosure is generally directed to power supply systems. More specifically, this disclosure is directed to an autonomous system and method for redundancy management of multiple power supplies.

BACKGROUND

A power supply is a device that provides electrical power to a load. Various power supplies for supplying power to electrical devices or systems are known in the art. Some systems utilize a single power supply, while other systems use more than one power supply (such as multiple power supplies coupled in parallel).

Difficulties with some power supply systems may arise during rapid and increasing power delivery conditions. Moreover, in a system with parallel power supplies, a master controller is typically utilized to host a voltage regulator whose output is a current command, which is substantially divided equally among the available power supplies. This architecture often requires a redundant master controller to be available in the event of a primary master controller's failure. In addition to managing the master controllers, problems may arise when trying to satisfy light load current demands. Small currents divided amongst a large number of power supplies can result in each power supply trying to control very small currents, which in contemporary switch mode power supplies is always a challenge. The master controller is also required to keep track of the number of available power supplies in order to properly scale the current command and set the voltage loop dynamics, which is an additional challenge.

SUMMARY

This disclosure provides an autonomous system and method for redundancy management of multiple power supplies.

In a first embodiment, a system includes an output terminal configured to be coupled to an electrical load and a plurality of power supplies coupled in parallel. Each of the power supplies includes a controller that is configured to (i) monitor a current output of a downstream power supply and a current output of an upstream power supply, (ii) maintain a standby state of the power supply in response to the downstream power supply providing power below a first threshold value, (iii) transition the power supply to a voltage regulation state in response to the downstream power supply providing power above the first threshold value, and (iv) provide constant current in response to the upstream power supply providing current above a second threshold value. The voltage regulation state representing a state in which the power supply regulates output current to the electrical load.

In a second embodiment, an apparatus includes a controller associated with a power supply that is configured to be coupled in parallel with an upstream power supply and a downstream power supply. The controller is configured to vary current provided by the power supply in response to a demand from an electrical load, increase a maximum current provided by the power supply in response to the downstream power supply providing power above a first threshold value, and increase a minimum power provided by the power supply in response to the upstream power supply providing power above a second threshold value.

In a third embodiment, a method includes providing power from a plurality of power supplies coupled in parallel to an electrical load. The method also includes transitioning individual power supplies in the plurality of power supplies from a standby state to a voltage regulation state in response to a downstream power supply providing current above a threshold value. The voltage regulation state represents a state in which the power supply regulates output current to the electrical load.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which:

FIG. 9 illustrates an example graph showing analysis results associated with a power supply system according to this disclosure.

DETAILED DESCRIPTION

FIGS. 1 through 9, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

This disclosure describes a system and method for autonomous load scheduling and balancing for a plurality of power supplies. The power supplies can be connected in parallel to a load or a distribution bus. Each of the power supplies includes processing circuitry configured to perform load scheduling. Therefore, an external control system is not required to load schedule the electrical demand across the power supplies. This disclosure also provides a system and method to drive as many power supplies as possible into a maximum current condition and to have one power supply provide active voltage regulation by providing a residual current.

Figure 1:
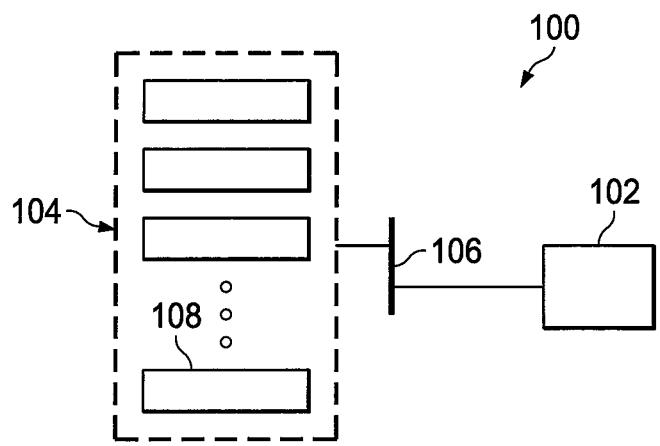
FIG. 1 illustrates an example system utilizing multiple parallel power supplies according to this disclosure.

FIG. 1 illustrates an example system 100 utilizing multiple parallel power supplies according to this disclosure. In the example shown in FIG. 1, an electrical load 102 is coupled to a power supply system 104. The electrical load 102 denotes a single electrical device or a plurality of electrical devices that receive electrical power from the power supply system 104. The electrical load 102 is coupled to the power supply system 104 through a distribution bus 106.

Often times, the electrical load 102 represents a variable-power load, meaning the electrical load 102 may have a lower power demand at some times and a higher power demand at other times. In some embodiments, the electrical load 102 operates at a constant voltage. When in a low power demand state (also referred to as a listening or low power state), the electrical load 102 requires a lower amount of electrical current to operate. When in the low power state, the electrical load 102 may receive power from the power supply system 104, or the electrical load 102 may receive power from another source. When in a high power demand state (also referred to as an active, pulse, or high power state), the electrical load 102 requires a higher amount of electrical current from the power supply system 104.

The power supply system 104 is able to deliver a variable amount of power at a constant voltage to the electrical load 102. As described in more detail below, the power supply system 104 includes a plurality of power supplies 108 coupled in parallel to the electrical load 102 or distribution bus 106. For example, the power supply system 104 could include ten power supplies 108, with each power supply 108 configured to deliver 10 Amps. In this configuration, the power supply system 104 is capable of delivering 100 Amps to the electrical load 102 or distribution bus 106. Of course, embodiments with more or fewer power supplies and embodiments with power supplies having different current ratings could be used.

Each power supply 108 includes any suitable structure for providing electrical energy to an electrical load or load bus. As described in more detail below, each power supply 108 also includes circuitry, such as a voltage regulator, a proportional-integral (PI) regulator, and a plurality of relays. In some embodiments, the power supply 108 could also include circuitry for autonomous load scheduling of electrical energy by a plurality of power supplies. In this document, the terms "autonomous," "automatic," and "automatically" (and their derivatives) refer to actions taken by a power supply in response to other actions and without user intervention and without control of an external control device that is external to the power supply. In particular embodiments, each power supply 108 automatically adjusts its power output in response to a determination regarding the power output of at least one adjacent power supply 108.

Although FIG. 1 illustrates one example of a system 100 utilizing multiple parallel power supplies, various changes may be made to FIG. 1. For example, the system 100 could include any number of loads 102, power supply systems 104, distribution buses 106, and power supplies 108. Also, the use of the distribution bus 106 is optional if the load 102 is coupled directly to an output of the power supply system 104.

Figure 2:
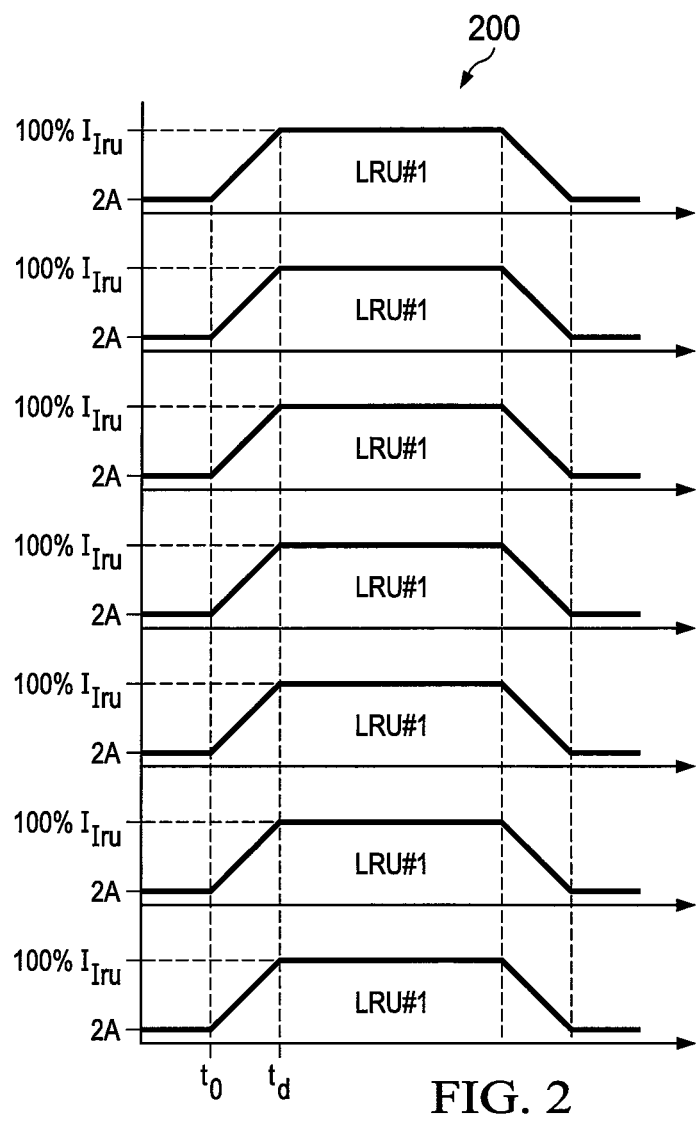
FIGS. 2 and 3 illustrate example load scheduling graphs for multiple parallel power supplies according to this disclosure.
Figure 3:
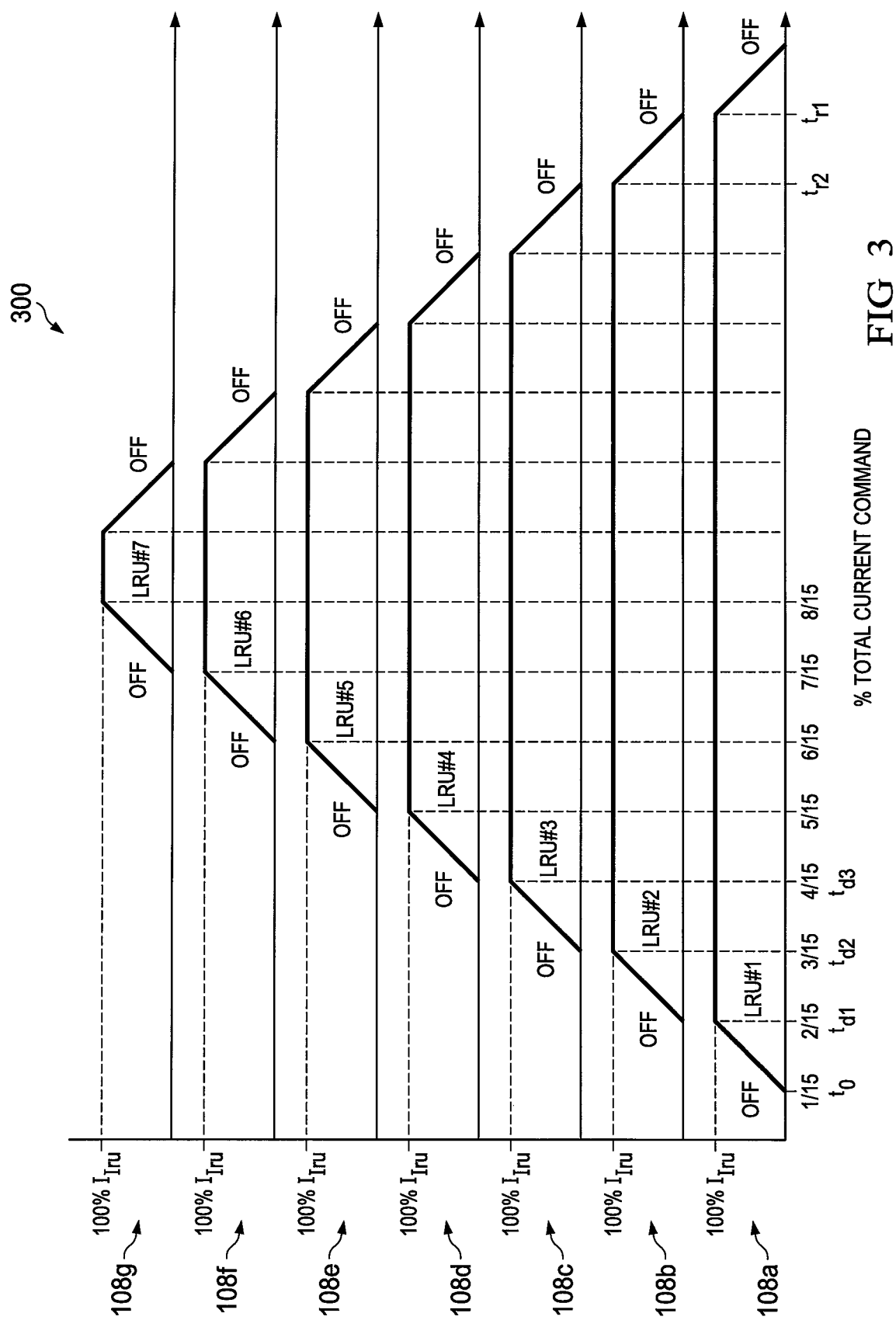

FIGS. 2 and 3 illustrate example load scheduling graphs for multiple parallel power supplies according to this disclosure. For ease of explanation, the load scheduling graphs of FIGS. 2 and 3 are described with respect to the system 100 of FIG. 1. However, the graphs are for illustration only, and other embodiments could include more or fewer components operating at the same or different energy levels.

FIG. 2 illustrates an example load scheduling graph 200 for multiple parallel power supplies. In this example, a power supply system 104 includes seven power supplies 108 configured to provide electrical energy to a variable electrical load 102. The seven power supplies 108 are configured to deliver up to 10 Amps each. Each power supply 108 is also limited to deliver a minimum of 2 Amps when operating, meaning the output of each power supply 108 will not drop below a 2 Amp threshold during operation (unless the power supplies 108 are shut completely off and deliver no current). The inability of the power supplies to operate below a minimum current destroys the system's ability to provide voltage regulation for light loads. 10 units sourcing 2 amps cannot regulate a load that demands 5 amps. Of course, embodiments having more or less power supplies with the same, higher, or lower threshold could be used.

Each power supply 108 is configured to deliver electrical energy in response to the demand of the electrical load 102. For example, each power supply 108 may be configured to operate simultaneously, or substantially simultaneously, to deliver the same amount of electrical energy to the electrical load 102. As a particular example, assume that the electrical load 102 increases its demand for electrical energy at time $t_0$. This may occur, for instance, when the electrical load 102 transitions from a listening state to an active state or from a low voltage state to a full power state. At time $t_0$, the power supplies 108 increase their outputs until the outputs reach 100% at time $t_d$. This may involve each power supply 108 transitioning from delivering zero current before time $t_0$ to delivering 10 Amps at time $t_d$.

Embodiments of the present disclosure provide a system and method that overcome deficiencies in certain multiple parallel supply systems, such as the example illustrated in FIG. 2. In accordance with this disclosure, the power supply system 104 includes a plurality of power supplies 108, at least some of which are configured to perform autonomous load scheduling. The autonomous load scheduling and balancing allows each of these power supplies 108 to control its output so that less electrical energy is delivered. As a particular example, assume the system 100 includes ten power supplies 108, and each power supply 108 is capable of providing 5 Amps of electrical current. If the demand from the load 102 is for 27 Amps, the autonomous load scheduling and balancing functionality may allow five power supplies 108 to provide 5 Amps of current each, one power supply 108 to provide 2 Amps of current, and four power supplies 108 to be in standby and output no current.

To provide this autonomous load scheduling and balancing functionality, a voltage regulator can be embedded in each power supply 108, and upper and lower limits can be placed on the regulator's output (current command). The upper and lower limits can be established by at least one downstream (predecessor) power supply and at least one upstream (*antecessor*) power supply, respectively. As the load's current demand increases, the voltage regulator function moves progressively upstream, while the downstream power supplies operate as constant current sources. Fault management can be realized by taking the current measurement from the next available upstream/downstream power supply. Communication can be realized either in analog or digital form, such as via a serial bus like a controller area network (CAN) bus that requires no master controller.

FIG. 3 illustrates an example load scheduling graph 300 for multiple parallel power supplies having autonomous load scheduling functionality. In this example, the power supply system 104 again includes seven power supplies 108 configured to provide electrical power to a variable electrical load 102. Each of the power supplies 108 is configured to deliver up to 10 Amps each. In certain embodiments, each of the power supplies 108 is configured to deliver a minimum of 2 Amps when operating.

Each power supply 108 includes circuitry for autonomous load scheduling of the electrical energy provided by a plurality of power supplies. Each power supply 108 is therefore configured to deliver electrical energy based on the demand from the electrical load 102 and the electrical energy provided by at least one adjacent downstream power supply 108. Each power supply 108 is also configured to operate sequentially and concurrently to deliver the required amount of electrical energy to the electrical load 102.

As load demand increases, each individual power supply 108 steps in and begins providing output current. As each individual power supply 108 reaches its maximum output current, the next power supply 108 in line assumes voltage regulation responsibility and starts to output current. This process continues until the power supply system 104 reaches a desired output current or a maximum total output current.

In FIG. 3, the electrical load 102 begins increasing a demand for electrical energy at time $t_0$, such as when the electrical load 102 begins transitioning from a listening state to an active state. At time $t_0$, a first power supply 108a leaves a standby state (where it was outputting no current) and starts increasing its output current. By time $t_{d1}$, the first power supply 108a is providing 10 Amps. At time $t_{d1}$, a second power supply 108b determines that the first power supply 108a is at 100%, and the second power supply 108b leaves a standby state (where it was outputting no current) and starts increasing its output current. By time $t_{d2}$, the second power supply 108b is providing 10 Amps for a total output current of 20 Amps. At time $t_{d2}$, a third power supply 108c determines that the second power supply 108b is at 100%, and the third power supply 108c leaves a standby state (where it was outputting no current) and starts increasing its output current. By time $t_{d3}$, the third power supply 108c is providing 10 Amps for a total output current of 30 Amps. This process can repeat in the remaining power supplies 108d-108g until a desired output current or a maximum total output current is reached. A similar process can occur in reverse when the electrical power required by the load 102 decreases.

In this way, the power supplies 108 operate sequentially and concurrently to deliver the required electrical power to the load 102. Each power supply 108 operates between 0% and 100% once its downstream adjacent power supply 108 reaches 100%. The remaining power supplies 108 remain in an off, standby, low power, or non-operating state in which the remaining power supplies 108 ideally output zero or substantially zero electrical energy. As power demand by the electrical load 102 ramps up, the number of power supplies 108 responding to the power demand ramps up, as well. As such, the power supply system 104 is able to increase an output current to a desired electrical demand, while maintaining voltage regulation, using a minimum number of power supplies and is able to deliver the desired electrical energy to the electrical load 102.

As another example, assume the electrical load 102 requires 12 Amps of current to operate in an active state. At time $t_0$, the first power supply 108a begins increasing its output current so that the first power supply 108a is providing 10 Amps of current at time $t_{d1}$. At time $t_{d1}$, the second power supply 108b determines that the first power supply is at 100%, and the second power supply 108b assumes active voltage regulation and begins increasing its output current up to 2 Amps. At time $t_{d2}$, the second power supply 108b is operating at 2 Amps for a total output current of 12 Amps. The first and second power supplies 108a-108b operate sequentially and concurrently to deliver the required electrical demand of 12 Amps to the load 102. As such, the remaining power supplies 108c-108g remain in an off, standby, low power, or non-operating state. Again, the power supply system 104 is able to deliver the desired electrical energy to electrical load 102.

In some embodiments, each upstream power supply 108b-108g is configured to start active voltage regulation once its adjacent downstream power supply 108a-108f reaches a threshold output value. In the examples above, the threshold output value was a 100% output of the adjacent downstream power supply, although other values could also be used. For instance, each upstream power supply 108b-108g may be configured to start active voltage regulation once its adjacent downstream power supply 108a-108f reaches 80% of its rated output value. In this scenario, two adjacent power supplies will briefly be in voltage regulation mode until the load demand drives the downstream power supply to its maximum. Thus, if 10 Amps of output current are needed, the power supply 108a could output 9 Amps, and the second power supply 108b could output 1 Amp.

Note that the threshold value does not necessarily represent a hard stop for the output of a power supply, merely that the threshold value can be used by another power supply to determine when to begin active voltage regulation. For example, assume an 80% threshold is used, the power supply 108a is outputting 9 Amps, and the second power supply 108b is outputting 1 Amp for a total output current of 10 Amps. If the electrical demand increases to 12 Amps, the first power supply 108a could increase its output up to 10 Amps and the second power supply 108b could increase its output up to 2 Amps without requiring any changes to the other power supplies 108c-108g. Alternatively, the first power supply 108a could increase its output to 9 Amps while and the second power supply 108b increases its output to 3 Amps. If necessary, additional power supplies 108c-108g can begin outputting current in response to increasing demand. In such an arrangement, the loop gain will change and care must be taken to set the system bandwidth to accommodate these gain variations.

The power supply system 104 is also configured to slowly decrease the output power in response to decreasing power demand from the electrical load 102. For example, a downstream power supply 108 is able to determine if an upstream power supply 108 is providing power below a minimum threshold value. If so, the downstream power supply 108 can assume active voltage regulation and begin to reduce its output power level. In FIG. 3, for example, the second power supply 108b begins decreasing its output current at time $t_{r2}$. By time $t_{r1}$, the second power supply 108b is operating at its minimum current capability, for example, 2.5 Amps. At time $t_{r1}$, the first power supply 108a determines that the second power supply is at a specified percentage of its minimum rated value (such as 25% or 2.5 Amps), and the first power supply 108a assumes active voltage regulation. This allows the second power supply 108b to remain at or above the 2 Amp minimum output until such time that the second power supply 108b can reduce its output to 0 Amps and enter standby.

In some embodiments, when one power supply 108 transitions from its minimum output current to no output current, another power supply 108 temporarily increases its output by the same amount to maintain a steady, non-step, ramp down of output power from the power supply system 104. Note, however, that this need not be the case.

In some embodiments, each power supply 108 is also configured to determine its own health status and adjust its operation based on the determined health status. When a particular power supply has faulted, the current level information from the downstream power supply is routed, via a relay, directly to the upstream power supply. When viewed from the upstream power supply perspective, the information represents the power being delivered by the closest healthy downstream unit. In a similar means the faulted power supply also routes the information from the upstream power supply, via the same relay, directly to the downstream power supply. Viewed from the downstream power supply perspective, the information represents the power being delivered by the closest healthy upstream unit. In such an arrangement it is as if the faulted unit does not exist. For example, the electrical load 102 may require 12 Amps to operate in an active state. At time $t_0$, the first power supply 108a begins increasing its output current to 10 Amps. At some point, either before or after time $t_0$, the second power supply 108b faults and isolates itself from the power supply system through its relays. The information from the first power supply is being routed directly to the third power supply as the second power supply is faulted. At time $t_{d1}$, the third power supply 108c may determine that the nearest downstream power supply, which is now the first power supply 108a, is at 100% since viewed from the perspectives of the third power supply 108c, the second power supply 108b does not exist. The third power supply 108c could therefore begin increasing its output to 2 Amps. In certain embodiments, the third power supply 108c includes circuitry to identify a fault or other problem with the second power supply 108b since viewed from the perspectives of the third power supply 108c, the second power supply 108b does not exist.

Although FIGS. 2 and 3 illustrate examples of load scheduling graphs for multiple parallel power supplies, various changes may be made to FIGS. 2 and 3. For example, the autonomous load schedule functionality could support any suitable uses of multiple power supplies to provide electrical power to a load 102.

Figure 4:
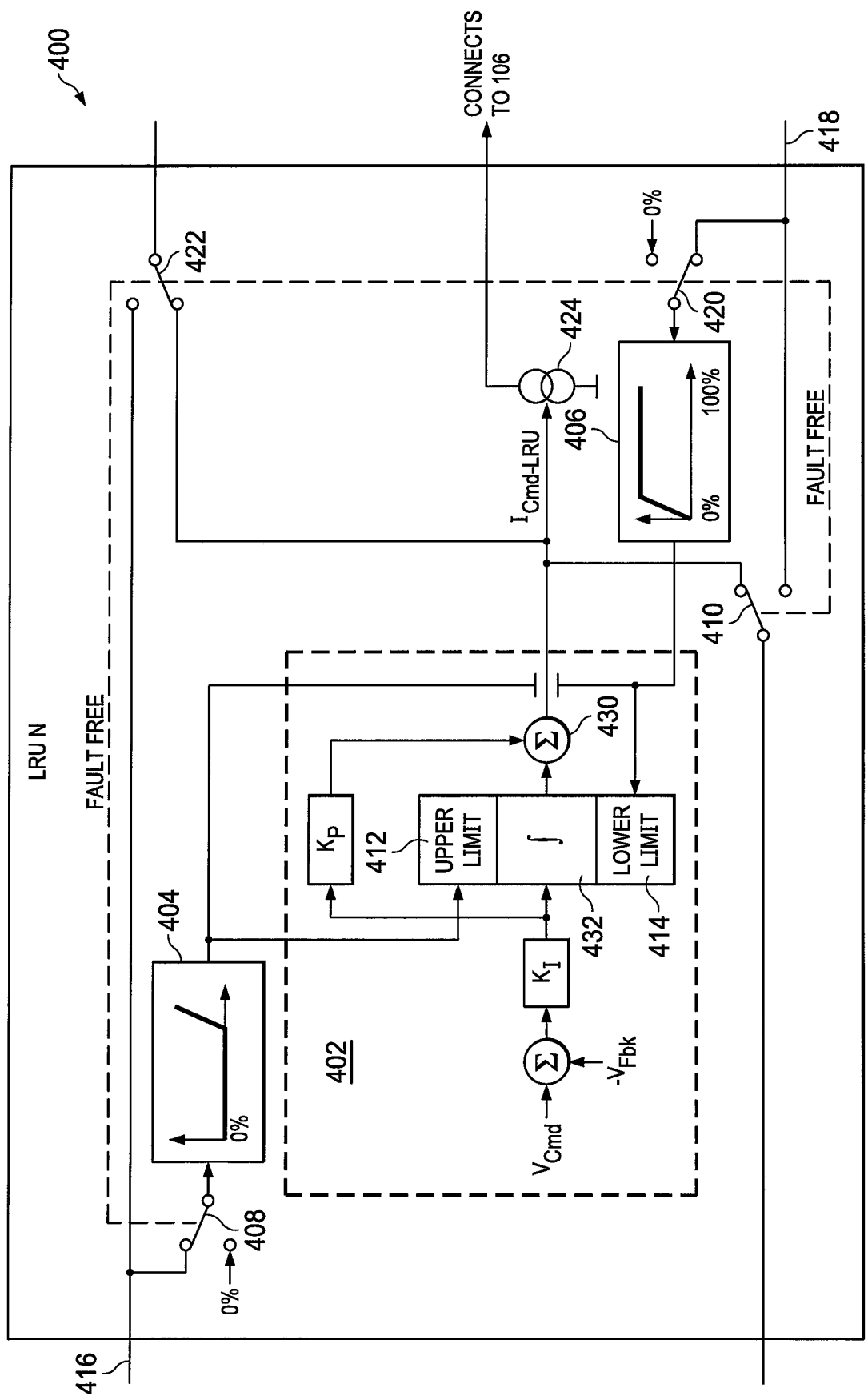
FIG. 4 illustrates an example individual analog power supply architecture according to this disclosure.

FIG. 4 illustrates an example analog power supply architecture 400 according to this disclosure. For ease of explanation, the architecture 400 of FIG. 4 is described as being used in each of the power supplies 108 in the system 100 of FIG. 1. However, the architecture 400 could be used in any other suitable power supply and in any other suitable system.

As shown in FIG. 4, the architecture 400 includes a PI regulator 402, a downstream function generator 404, and an upstream function generator 406, that, together, form a controller. The architecture 400 also includes a four pole, double throw relays 408, 410, 420 and 422 and a current source 424. The architecture 400 is capable of monitoring three signals: (A) an output voltage; (B) a downstream power supply's output current; and (C) an upstream power supply's output current.

Figure 5A:
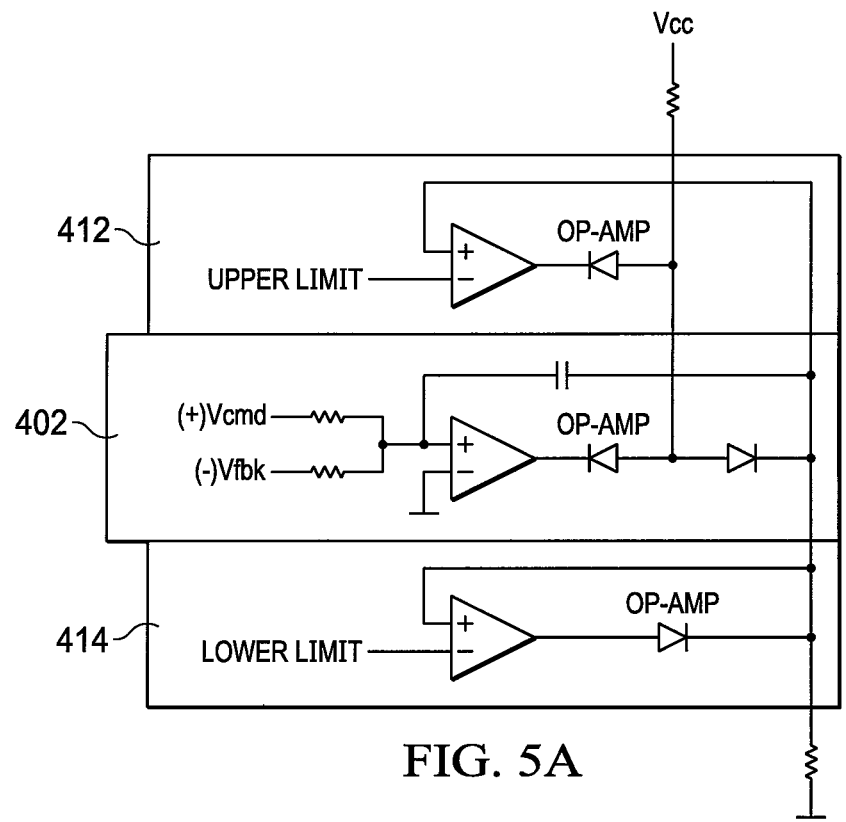
FIG. 5A illustrates an example proportional-integral regulator circuit according to this disclosure.

The PI regulator 402 is comprised of a proportional term plus an integral term summed together. The downstream function generator 404 and the upstream function generator 406 seek to limit the output of the PI regulator 402, which is the output of the summing junction 430 to the right of the integrator 432. The PI regulator 402 is driven by a scaled error between the commanded voltage and the measured voltage. The PI regulator 402 integrates the scaled voltage error subject to the upper and lower limits imposed by the downstream function generator 404 and upstream function generator 406. The output of the PI regulator 402 is summed with a scaled version of the regulator input to form the PI regulator output which is also subject to the limits imposed by the downstream function generator 404 and upstream function generator 406. The limited PI regulator 402 output is a current command that establishes the output current level of the power supply symbolically represented by the current source 424. The PI regulator 402, which has a range limited in both directions, includes an upper limit 412 and a lower limit 414. The upper limit 412 represents an upper current command limit of the power supply 108, and the lower limit 414 represents a lower current command limit of the power supply 108. The upper limit 412 and the lower limit 414 thereby define an operating range for the power supply 108. The PI regulator 402 can be embedded in one or more processors or comprised of processing circuitry, such as one or more OP-AMPS, diodes, regulators, resistors and clamps configured to implement the PI regulator 402, upper limit 412 and lower limit 414. An example of circuitry for the PI regulator is shown in FIG. 5A.

When the power supply is in operation, namely actively regulating the voltage, the upper limit 412 can be 100% and the lower limit 414 can be 0%. When the power supply is in standby, the upper limit 412 and the lower limit 414 can both be 0%. When the power supply 108 is operating as a constant current source, the upper limit is 100% and the lower limit 414 is 100%. Control of the power supply 108 is therefore governed by the upper limit 412 and lower limit 414, which are controlled by the downstream function generator 404 and upstream generator 406 respectively. For example, when the power supply 108 is rated to deliver 10 Amps, the power supply 108 can output up to 10 Amps when the upper limit 412 is at 100%. The lower limit 414 defines a floor value such that, when the lower limit 414 is set to 0%, the power supply 108 is able to deliver 0 Amps. If the lower limit 414 is set to 100%, the power supply is fixed to deliver 100% power, such as 10 Amps.

Figure 5B:
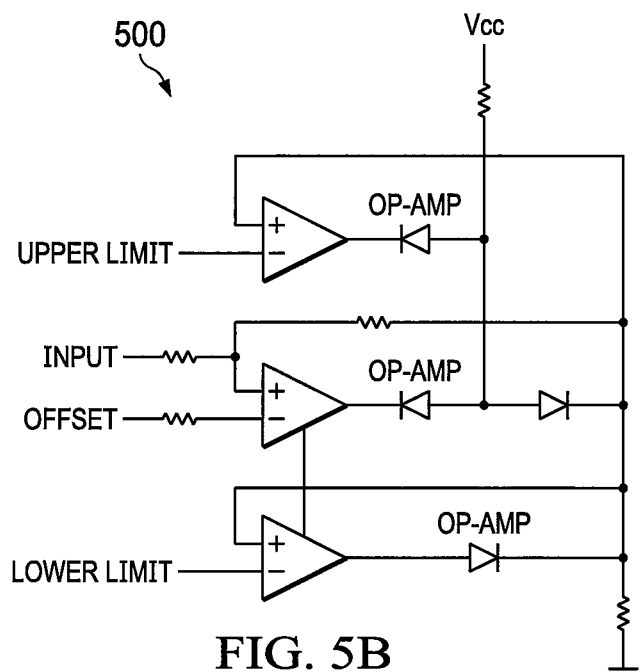
FIG. 5B illustrates an example function generator circuit according to this disclosure.

The downstream function generator 404 is coupled to an input terminal 416 through one of the double throw poles within the relay 408. The downstream function generator 404 can include any suitable circuitry configured to perform the functions of a function generator, such as one or more OP-AMPS, diodes, and resistors to detect current output from a downstream power supply 108. The downstream function generator 404 can be embedded in one or more processors or comprised of processing circuitry, such as one or more OP-AMPS, diodes, regulators, resistors and clamps configured to implement the function generator. An example of circuitry for a function generator 500 is shown in FIG. 5B. The downstream function generator 404 detects a current command output from the PI regulator of a downstream power supply 108. The downstream function generator 404 is also coupled to the PI regulator 402 to provide input information for setting the upper limit 412. The downstream function generator 404 monitors operation of a downstream power supply through the input terminal 416. When the downstream function generator 404 determines that the downstream power supply is operating at 100% or at or above a threshold value, the downstream function generator 404 can raise the upper limit 412 of the PI regulator 402 to 100%, effectively releasing the PI regulator 402 to start actively regulating the output voltage based on the demand.

In some embodiments, the downstream function generator 404 varies the upper limit 412 based on the operating status of the downstream power supply. For example, when the downstream power supply is operating above a threshold, such as above 95% but below 100%, the upper limit 412 can be set to a specified value, such as 5%. When the downstream power supply is operating below the threshold, such as below 95%, the upper limit 412 can be set to 0%. Therefore, the upper limit 412 can be forced to zero if the adjacent downstream power supply is outputting less than a threshold amount of current. When the downstream function generator 404 detects that the downstream power supply has increased its output power, the downstream function generator 404 can increase the upper limit 412. When the downstream function generator 404 detects that the downstream power supply has decreased its output power, the downstream function generator 404 can decrease the upper limit 412.

The upstream function generator 406 is coupled to an output terminal 418 through one of the double throw poles within the relay 420. The upstream function generator 406 can include any suitable circuitry configured to perform the functions of a function generator, such as one or more OP-AMPS, diodes, and resistors to detect current output from an upstream power supply 108. The upstream function generator 406 can be embedded in one or more processors or comprised of processing circuitry, such as one or more OP-AMPS, diodes, regulators, resistors and clamps configured to implement the function generator. An example of circuitry for the function generator 500 is shown in FIG. 5B. The difference between the upstream and downstream function generator comes down to the offset value. The upstream function generator 406 detects a current command output from the PI regulator of an upstream power supply 108. The upstream function generator 406 is also coupled to the PI regulator 402 to provide input information for setting the lower limit 414. The upstream function generator 406 monitors operation of an upstream power supply. In certain embodiments, when the upstream function generator 406 determines that the upstream power supply is delivering an output current at or above a threshold value, the upstream function generator 406 sets the lower limit 414 of the PI regulator 402 to 100%, effectively locking the power supply 108 into an active state to deliver a maximum current. In certain embodiments, when the upstream function generator 406 determines that the upstream power supply is decreasing its output current and is approaching a minimum threshold value, the upstream function generator 406 reduces the lower limit 414 of the PI regulator 402 to 0%, effectively releasing the power supply 108 to assume active voltage regulation.

In some embodiments, the upstream function generator 406 varies the lower limit 414 based on the operating status of the upstream power supply. For example, when the upstream power supply is operating at or below a minimum threshold, such as less than 5% but above 0%, the lower limit 414 can be set to a specified value, such as 95%. The lower limit 414 can also be forced to 100% if the adjacent upstream power supply is outputting more than 5%. When the upstream function generator 406 determines that the upstream power supply has increased its output power, the upstream function generator 406 can increase the lower limit 414. When the upstream function generator 406 determines that the upstream power supply has decreased its output power, the upstream function generator 406 can decrease the lower limit 414.

The relays 408, 410, 420, and 422 operate to isolate the power supply 108 in the event of a fault or poor health of the power supply 108. For example, in the event of a fault that causes the power supply 108 to shut down, each of the relays 408, 410, 420, and 422 switches to the opposite terminal to couple the upstream power supply ($LRU_{N+1}$) directly to the downstream power supply ($LRU_{N-1}$), bypassing the faulty power supply 108 ($LUR_N$), each shown in FIG. 7. Therefore, the information from the downstream power supply can be passed directly to the upstream power supply, and the information from the upstream power supply can be passed directly to the downstream power supply. In certain embodiments, the relays are a four pole double throw relay in which relays 408, 410, 420 and 422 are comprised in the form of a single relay.

While the examples illustrated in FIG. 4 provide an example analog implementation, embodiments of the present disclosure can be realized via a serial communications bus that does not require a master controller. One such bus is the CAN bus. Whereas, in the analog architecture 400, current commands originating in the voltage regulators of each power supply 108 are exchanged between neighboring power supplies, in a digital implementation, the same current command information is shared between all power supplies via the serial CAN bus.

Figure 6:
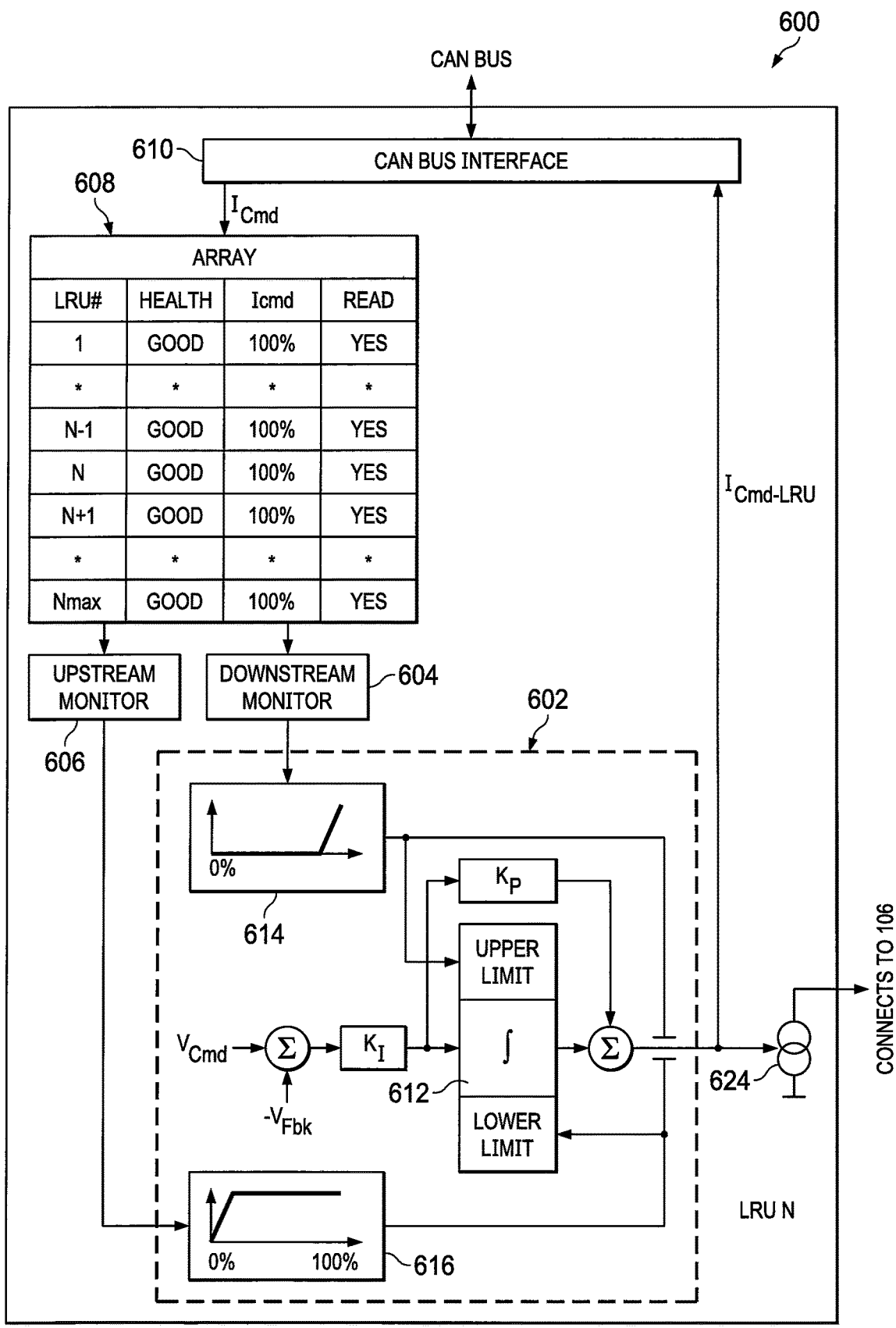
FIG. 6 illustrates an example digital power supply architecture according to this disclosure.

FIG. 6 illustrates an example digital power supply architecture 600 according to this disclosure. For ease of explanation, the architecture 600 of FIG. 6 is described as being used in each of the power supplies 108 in the system 100 of FIG. 1. However, the architecture 600 could be used in any other suitable power supply and in any other suitable system.

As shown in FIG. 6, the architecture 600 is used to provide electrical energy at a constant voltage and variable current to an electrical load. The architecture 600 includes a controller 602, a downstream monitor 604, an upstream monitor 606, a current command array stored in memory 608, a CAN bus interface 610 and a current source 624. The architecture 600 is capable of monitoring the following signals: (A) the power supply output voltage; (B) the health status of every power supply within the system; and (C) the output current command of every power supply within the system.

The controller 602 is configured to regulate an output current of the power supply 108 by providing a current command to the current source 624. The controller 602 includes any suitable structure for controlling a power supply, such as one or more processors or processing circuitry. For example, the controller 602 can include processing circuitry for a PI regulator 612, downstream function generator 614 and upstream function generator 616. The controller 602 is coupled to the downstream monitor 604 through the downstream function generator 614 and the upstream monitor 606 through the upstream function generator 616. The controller 602 also sets an upper current limit and a lower current limit for the instant power supply 108 (namely the power supply under discussion in FIG. 6) depending on an operating state of the power supply 108.

Using the CAN Bus interface 610, each power supply 108 within the system is able to broadcast its location along with its health status and its present current command. Additionally each power supply 108 within the system will monitor the other information being broadcast along the CAN bus and each power supply 108 will form its own system wide array comprised of the unit address, unit health status, unit current command, and unit data latency status (is the data new or has the data been used).

Each power supply 108 contains a downstream monitor 604 that continuously monitors the current command array stored in memory 608. The downstream monitor 604 starts with the host address and interrogates the current command array to find the nearest downstream power supply that is healthy. The downstream monitor 604 then outputs an associated current command to the downstream function generator 614 and marks the source of the current command as having been read. Marking the data as having been read assures that the monitor is not using old data from a unit that has recently faulted and is incapable of broadcasting its fault status. Once the current command has been selected for the downstream function generator 614, the architecture 600 behaves as in the analog version.

Each power supply 108 also contains an upstream monitor 606 that continuously monitors the current command array stored in memory 608. The upstream monitor 606 starts with the host address and interrogates the current command array stored in memory 608 to find the nearest upstream power supply 108 that is healthy. The upstream monitor 606 then outputs the associated current command to the upstream function generator 616 and marks the source of the current command as having been read. Marking the data as having been read assures that the monitor is not using old data from a unit that has recently faulted and is incapable of broadcasting its fault status. Once the current command has been selected for the upstream function generator 616, the system behaves as in the aforementioned analog version.

That is, when the power supply 108 is in operation actively providing voltage regulation, the upper current limit can be 100% and the lower current limit can be 0%. When the power supply 108 is in standby, the upper current limit and the lower current limit can be 0%. The controller 602 can set the upper limit to 100% in order to enable the power supply 108 to output full power. For example, when the power supply 108 is rated to deliver 10 Amps, the power supply 108 can output up to 10 Amps when the controller 602 sets the upper current limit to 100%. The lower current limit defines a floor value such that, when the controller 602 sets the lower current limit to 0%, the power supply 108 is able to deliver 0 Amps. If the lower current limit is set to 100%, the power supply is fixed to deliver 100% of power, such as 10 Amps. If the upper current limit is set to 0%, the power supply is fixed to deliver no power. Therefore, the controller 602 sets the upper and lower current limits to define an operating range for the power supply 108.

In some embodiments, the controller 602 varies the upper limit based on the operating status of the downstream power supply. For example, when the downstream power supply is operating above a threshold, such as above 95% but below 100%, the upper limit can be set to a specified value, such as 5%. When the downstream power supply is operating below the threshold, such as below 95%, the upper limit can be set to 0%. Therefore, the upper limit is forced to zero if the downstream power supply is outputting less than 95%. When the controller 602 determines that the downstream power supply has increased its output power, the controller 602 can increase the upper limit. When the controller 602 determines that the downstream power supply has decreased its output power, the controller 602 can decrease the upper limit.

In some embodiments, the controller 602 varies the lower limit based on the operating status of the upstream power supply. For example, when the upstream power supply is operating at or below a threshold, such as below 5% but above 0%, the lower limit can be set to a specified value, such as 95%. The lower limit can also be forced to 100% if the upstream power supply is outputting more than 5%. When the controller 602 determines that the upstream power supply has increased its output power, the controller 602 can increase the lower limit. When the controller 602 determines that the upstream power supply has decreased its output power, the controller 602 can decrease the lower limit.

Unlike in the analog architecture 400 illustrated in FIG. 4, the digital architecture 600 does not require any bypass relays. The fault management is accomplished by data interrogation of the health status of every power supply within the current command array or the failure of the faulted power supply to provide updated information resulting is the read status not being updated.

The controller 602 in each power supply 108 can maintain a health table in a memory 608 or other storage device. Additionally, one or more of the threshold values can be stored in the memory 608. The memory or other storage device represents any structure(s) capable of storing and facilitating retrieval of information (such as data, program code, and/or other suitable information on a temporary or permanent basis). The storage device can represent a random access memory or any other suitable volatile or non-volatile storage device(s). The storage device can also contain one or more components or devices supporting longer-term storage of data, such as a read only memory, hard drive, Flash memory, or optical disc. The following represents one example implementation of a health table.

| LRU# | Data Status | Health Status | Current command |
|---|---|---|---|
| 0 | Unread | Healthy | 100% |
| ... | | | |
| N − 2 | Unread | Healthy | 100% |
| N − 1 | Read | Unhealthy | 0% |
| N | Unread | Healthy | 50% |
| N + 1 | Unread | Healthy | 0% |
| ... | | | |
| Nmax + 1 | Unread | Healthy | 0% |

In some embodiments, each controller 602 uses a unit identification (ID) for the other power supplies to track their statuses.

The control logic executed by the controller 602 can be the same as the analog version. Also, for each real time interrupt (RTI), the controller 602 can mark data as "read" to prevent data corruption.

Although FIGS. 4, 5 and 6 illustrate examples of power supply architectures, various changes may be made to FIGS. 4, 5 and 6. For example, while FIGS. 4, 5 and 6 illustrate specific examples of techniques for controlling a power supply, other approaches (such as those using different analog or digital components) could be used to control the power supply.

Figure 7:
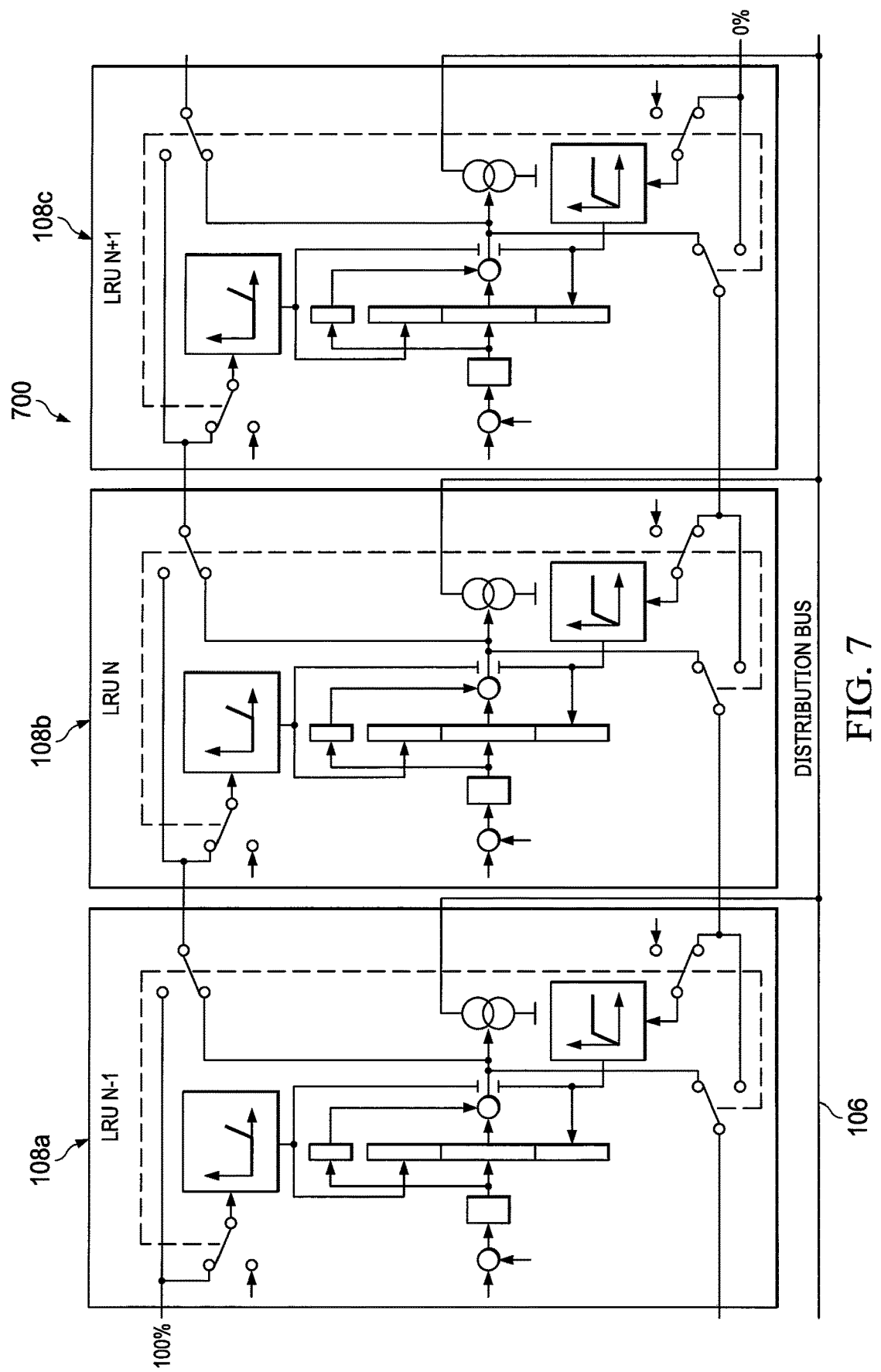
FIG. 7 illustrates an example architecture for power supplies configured to autonomously load schedule according to this disclosure.

FIG. 7 illustrates an example architecture 700 for a power supply system configured to autonomously load schedule according to this disclosure. For ease of explanation, the architecture 700 of FIG. 7 is described as being used in the power supply system 104 in the system 100 of FIG. 1. However, the architecture 700 could be used in any other suitable power supply system and in any other suitable system.

In the example shown in FIG. 7, the architecture 700 illustrates the analog communication between three power supplies including a first power supply 108a, a second power supply 108b, and a third power supply 108c. Although the analog architecture 400 is illustrated in the example shown in FIG. 7, embodiments using the digital architecture 600 could be used without departing from the scope of the present disclosure. Each of the power supplies 108a-108c is implemented using the architecture 400, and the power supplies 108a-108c are coupled in parallel to an output terminal 702. The output terminal 702, which can be the same as output terminal 106 of FIG. 1, is configured to couple to an electrical load, such as load 102 of FIG. 1.

Although three power supplies are illustrated here, embodiments with more or fewer power supplies could be used.

Each power supply 108 is configured to operate in parallel with the other power supplies to deliver power to an electrical load sequentially and concurrently. The power supplies 108 operate without the need for a higher-level master controller to schedule current commands for each individual power supply. Embedded in each power supply 108 is a controller (such as controller 602 of FIG. 6 or the combination of PI regulator 402, downstream function generator 404, and upstream function generator 406 of FIG. 5) that monitors the output voltage of that power supply 108, the downstream power supply's output current, and the upstream power supply's output current.

In the example shown in FIG. 7, when a load is applied to the power supply system 104, the first power supply 108a switches to an active state and begins to deliver power to the load. The second power supply 108b operates in standby mode, monitoring the output current from the first power supply 108a. When the output current from the first power supply 108a reaches a threshold value, the second power supply 108b switches to active. The threshold value can be any fixed or variable value, such as 80%, 85%, 90%, 95%, 100%, or any other numerical value between 0% and 100%.

The second power supply 108b then provides active voltage regulation and controls output current in response to the power demand from the load. When the output current from the second power supply 108b reaches a threshold value, the third power supply 108c switches to active voltage regulation. The threshold value can be any fixed or variable value, such as 80%, 85%, 90%, 95%, 100%, or any other numerical value between 0% and 100%. Therefore, the third power supply 108c controls output current in response to the power demand from the load.

When the power demand falls, the third power supply 108c reduces its delivered power. When the output current from the third power supply 108c drops below a threshold value, the second power supply 108b assumes voltage regulation to reduce the delivered power. The threshold value can be any fixed or variable value, such as 0%, 5%, 10%, 15%, 20%, or any other numerical value between 0% and 100%.

When the output current from the second power supply 108b drops below a threshold value, the first power supply 108a assumes voltage regulation to reduce delivered power. The threshold value can be any fixed or variable value, such as 0%, 5%, 10%, 15%, 20%, or any other numerical value between 0% and 100%.

Each power supply 108 contains built in health monitoring that monitors such things as over temperature for example. Each power supply 108 is also able to operate while one or more other power supplies 108 isolate themselves in the event of a fault or poor health. For example, in the event of a fault that causes the second power supply 108b to shut down, the relays (relays 408, 410, 420 and 422 of FIG. 5) in the second power supply 108b couple the third power supply 108c to the first power supply 108a, bypassing the second power supply 108b. The same result can be realized from interrogation of the array in the digital version of FIG. 6.

In some embodiments, the power supply system 104 can be configured to have as many power supplies 108 as possible operating at their maximum power, with one power supply providing the residual power (if needed). The balance of the power supplies can operate in standby. As the load demand increases, the power supply providing the residual power reaches its upper limit, and the next power supply in line assumes the voltage regulation function and supplies the residual power. As the load demand decreases, the power supply providing the residual power reaches its lower limit, and responsibility for voltage regulation is transferred to the next downstream power supply.

The information between adjacent power supplies can be transferred in any suitable manner, such as through an analog or digital interface. If an individual power supply suffers a fault, the information sharing between adjacent power supplies can be modified via a relay (analog), fault flags (digital), or other mechanism, thereby eliminating any need for a higher-level unit to reconfigure the system. Moreover, since the voltage regulator functionality may only be used to control the residual current, the need to reconfigure the voltage regulator to match the number of available power supplies is eliminated.

The first power supply 108a in the system is presented a 100% current command from a fictitious downstream power supply in order that the first power supply comes up in the voltage regulator configuration. Likewise, the last power supply 108n in the system is presented a 0% current command from a fictitious upstream power supply in order that the last power supply comes up in the standby/unloaded configuration."

Although FIG. 7 illustrates one example of an architecture 700 for a power supply system configured to autonomously load schedule, various changes may be made to FIG. 7. For example, the architecture 700 is illustrated as using multiple instances of the architecture 400 shown in FIG. 4. However, the architecture 700 could use multiple instances of other architectures, such as the architecture 600 shown in FIG. 6.

Figure 8:
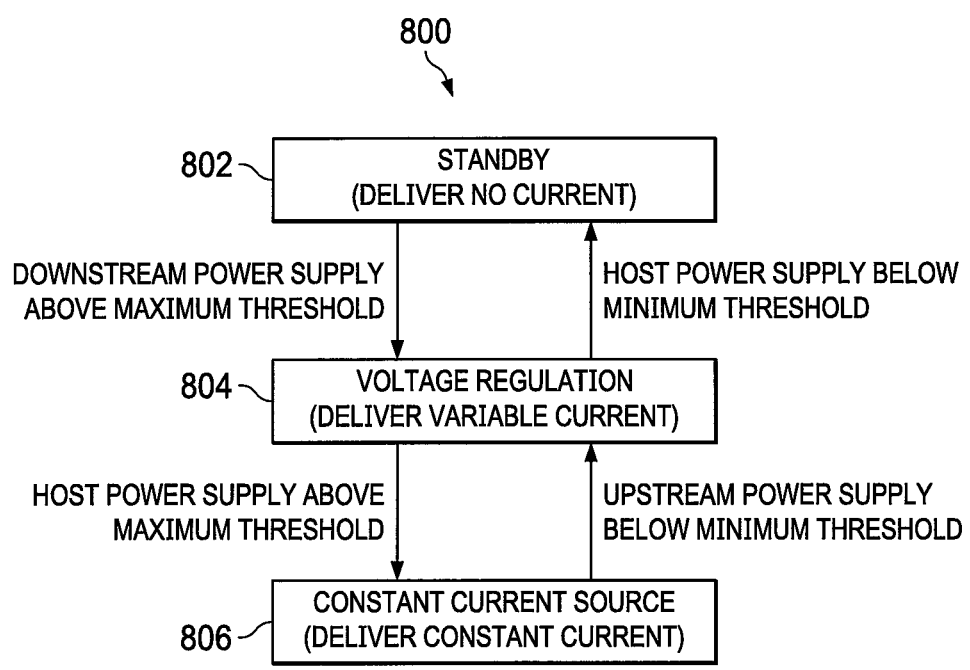
FIG. 8 illustrates an example method for providing power from a plurality of power supplies coupled in parallel to an electrical load according to this disclosure.

FIG. 8 illustrates an example method 800 for providing power from a plurality of power supplies coupled in parallel to an electrical load according to this disclosure. For ease of explanation, the method 800 is described with respect to the system 100 of FIG. 1. However, the method 800 could be used with any other suitable system.

At power up, each power supply 108 is configured to enter the standby state 802 and deliver no current to the system. While in the standby state 802, each power supply continually monitors the downstream power supply current level and determines if the downstream power supply is above a maximum threshold. Once the downstream power supply has exceeded the maximum threshold, the method of 800 will initiate a state change and the power supply will leave the stand-by state 802 and enter the voltage regulator state 804 wherein the power supply 108 will actively provide voltage regulation.

While in the voltage regulation state 804, the power supply 108 will monitor and broadcast its own current command generated by its internal PI regulator. Should the current command drop below a minimum threshold the power supply will exit the voltage regulator state 804 and return to the standby state 802. Likewise, should the current command exceed the maximum threshold the power supply will exit the Voltage regulation state and enter the constant current source state 806.

While in the constant current state 806, the power supply will output a constant current and continuously monitor the upstream power supply current command. Should the upstream current command drop below a minimum threshold the power supply will exit the constant current state 806 and return to voltage regulation state 804. Since the state information is embedded in the current command of each power supply 108 and since each power supply 108 monitors its neighbors current commands, synchronization of power supply states is implicit and assured.

Although FIG. 8 illustrates one example of a method 800 for providing power from a plurality of power supplies coupled in parallel to an electrical load, various changes may be made to FIG. 8. For example, while shown as a series of state machines, various states in FIG. 8 could overlap, occur in parallel, occur in a different order, or occur multiple times.

FIG. 9 illustrates an example graph 900 showing analysis results associated with a power supply system according to this disclosure. In FIG. 9, a first graph portion 902 illustrates output from individual power supplies 108, a second graph portion 904 indicates an output current of the power supply system 104, and a third graph portion 906 illustrates an output voltage of the power supply system 104. At a startup time 908, the voltage increases from 0 to 325 volts, and an inrush current requires a total output current of 400 Amps, which further causes over fifteen power supplies to operate in a maximum current mode. As the output voltage ramps up and approaches the set point, the power supplies sequentially transition back into voltage regulation mode and then into a standby state. As the power demand increases, the output current increases, and sequentially the individual power supplies ramp up into an active state followed by a constant current state. At time 910, one of the power supplies faults, causing a minor virtually transient-free dip in output voltage and a minor dip in the output current. In response to the fault, the faulted power supply is bypassed and drops out of the power supply circuit. Additional power supplies that are upstream from the faulted power supply assume the demand requirement.

Although FIG. 9 illustrates one example of a graph 900 showing analysis results associated with a power supply system, various changes may be made to FIG. 9. For example, the behavior shown in FIG. 9 is for illustration only, and other behaviors can be obtained depending on the implementation of the system.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
an output terminal configured to be coupled to an electrical load; and
a plurality of power supplies coupled in parallel, wherein a first power supply of the plurality of power supplies comprises a controller configured to:
monitor a current output of a downstream power supply and a current output of an upstream power supply, wherein the downstream power supply and the upstream power supply are distinct from the first power supply;
maintain a standby state of the first power supply in response to the downstream power supply providing current below a first threshold value;
transition the first power supply to a voltage regulation state in response to the downstream power supply providing current above the first threshold value, the voltage regulation state representing a state in which the first power supply regulates output current to the electrical load; and
provide a constant current output in response to the upstream power supply providing current above a second threshold value.

2. The system of claim 1, wherein
a respective power supply disposed between an adjacent downstream power supply providing a maximum current and an adjacent upstream power supply providing no current is configured to regulate a voltage delivered to the electrical load.

3. The system of claim 1, wherein the controller comprises:

a proportional-integral (PI) regulator comprising an upper limit and a lower limit;
wherein the upper limit is configured to be set to a maximum current output between 0% and 100%; and
wherein the lower limit is configured to be set to a minimum current output between 0% and 100%.

4. The system of claim 3, wherein the PI regulator is configured to increase the upper limit to 100% in response to the downstream power supply providing current above the first threshold value.

5. The system of claim 3, wherein the PI regulator is configured to increase the lower limit to 100% in response to the upstream power supply providing current above the second threshold value.

6. The system of claim 1, wherein the first power supply further comprises:
one or more relays configured to bypass the first power supply and couple the downstream power supply to the upstream power supply in response to a fault.

7. The system of claim 1, wherein the controller is further configured to at least one of:
broadcast a health status of at least one power supply to at least one other power supply; and
maintain health status information regarding the power supplies.

8. An apparatus comprising:
a controller associated with a power supply that is configured to be coupled in parallel with an upstream power supply and a downstream power supply;
wherein the controller is configured to:
vary current provided by the power supply in response to a demand from an electrical load;
monitor a current output of the downstream power supply and a current output of the upstream power supply;
increase a maximum current provided by the power supply in response to the downstream power supply providing current above a first threshold value; and
increase a minimum current provided by the power supply in response to the upstream power supply providing current above a second threshold value.

9. The apparatus of claim 8, wherein
the apparatus is configured to regulate a voltage delivered to the electrical load when the power supply is disposed between an adjacent downstream power supply providing a maximum current and an adjacent upstream power supply providing no current.

10. The apparatus of claim 8, wherein the controller comprises:
a proportional-integral (PI) regulator comprising an upper limit and a lower limit;
wherein the upper limit is configured to be set to a maximum current output between 0% and 100%; and
wherein the lower limit is configured to be set to a minimum current output between 0% and 100%.

11. The apparatus of claim 10, wherein the PI regulator is configured to increase the upper limit to 100% in response to the downstream power supply providing current above the first threshold value.

12. The apparatus of claim 10, wherein the PI regulator is configured to increase the lower limit to 100% in response to the upstream power supply providing current above the second threshold value.

13. The apparatus of claim 8, further comprising:
one or more relays configured to bypass the power supply and couple the downstream power supply to the upstream power supply in response to a fault.

14. The apparatus of claim 8, wherein the controller is further configured to at least one of:
broadcast a health status of at least one power supply to at least one other power supply; and
maintain health status information regarding the power supplies.

15. A method comprising:
monitoring, by a controller, a current output of a downstream power supply and a current output of an upstream power supply, wherein the downstream power supply and the upstream power supply are distinct from a power supply comprising the controller, wherein the power supply, the downstream power supply, and the upstream power supply are part of a plurality of power supplies coupled in parallel to an electrical load;
maintaining a standby state of the power supply in response to the downstream power supply providing current below a first threshold value;
transitioning the power supply from the standby state to a voltage regulation state in response to the downstream power supply providing current above the first threshold value, the voltage regulation state representing a state in which the power supply regulates output current to the electrical load; and
providing a constant current output in response to the upstream power supply providing current above a second threshold value.

16. The method of claim 15, further comprising:
increasing an upper power limit of the power supply to 100% in response to the downstream power supply providing current above the first threshold value.

17. The method of claim 15, further comprising:
increasing a lower power limit of the power supply to 100% in response to the upstream power supply providing current above the second threshold value.

18. The method of claim 15, further comprising:
bypassing the power supply in response to a fault.

19. The method of claim 15, further comprising at least one of:
broadcasting a health status of at least one power supply to at least one other power supply; and
maintaining health status information regarding the power supplies.

20. The method of claim 18, wherein bypassing the power supply comprises coupling the downstream power supply to the upstream power supply using at least one relay.

* * * * *